United States Patent [19]

Kassai

[11] Patent Number: 4,530,416
[45] Date of Patent: Jul. 23, 1985

[54] HYDROSTATIC PROPULSION SYSTEM AND METHOD WITH INCHING THROTTLE AND BRAKE

[75] Inventor: Denes P. Kassai, Chino, Calif.

[73] Assignee: FMC Corporation, Chicago, Ill.

[21] Appl. No.: 497,397

[22] Filed: May 23, 1983

[51] Int. Cl.³ .............................................. F16H 39/46
[52] U.S. Cl. .................................... 180/307; 60/444; 60/490; 180/308
[58] Field of Search ............... 180/306, 307, 308, 242; 60/444, 445, 451, 490

[56] References Cited

U.S. PATENT DOCUMENTS

| | | | |
|---|---|---|---|
| 3,236,049 | 2/1966 | Reinke | 60/444 |
| 3,310,825 | 3/1967 | Tamny | 15/82 |
| 3,316,578 | 5/1967 | Tamny | 15/87 |
| 3,381,439 | 5/1968 | Brown et al. | 60/490 |
| 3,477,225 | 11/1969 | Cryder et al. | 60/433 |
| 3,636,580 | 1/1972 | Woodworth | 15/84 |
| 3,761,988 | 10/1973 | Overton | 15/83 |
| 3,971,453 | 7/1976 | Patton et al. | 180/306 X |
| 4,011,768 | 3/1977 | Tessenske | 180/307 X |
| 4,382,360 | 5/1983 | Dummer | 60/444 |
| 4,395,878 | 8/1983 | Morita et al. | 60/444 X |
| 4,396,087 | 8/1983 | Rock et al. | 180/308 X |
| 4,400,939 | 8/1983 | Moranduzzo et al. | 60/444 X |
| 4,402,181 | 9/1983 | Acker et al. | 180/308 X |
| 4,434,616 | 3/1984 | Christopher et al. | 60/451 |
| 4,463,559 | 8/1984 | Holdenried | 60/444 |

Primary Examiner—Joseph F. Peters, Jr.
Assistant Examiner—Mark C. Dukes
Attorney, Agent, or Firm—A. J. Moore; H. M. Stanley; R. B. Megley

[57] ABSTRACT

A hydrostatic propulsion system and method of operation is disclosed for smoothly driving a vehicle, such as a street sweeper. The system includes a shift lever for selectively moving a pump stroking valve into reverse, neutral, low forward, and fast forward speed positions to prepare the system. After the shift lever has been placed in a forward or reverse position, an accelerator pedal must be depressed to partially or fully close an inching throttle valve before the pump swash plate moves from its zero piston displacement position and begins to pump fluid to the hydrostatic motors. Hydrostatic braking forces are applied when the accelerator pedal is released and also in response to initial depression of a brake pedal for providing normal braking to the vehicle. Further depression of the brake pedal operates a conventional brake system for panic stops. Movement into the high forward speed range is accomplished by moving the shift lever into "high" which activates a circuit for shifting the swash plates of the hydrostatic motors into high speed positions.

7 Claims, 6 Drawing Figures

FIG_1
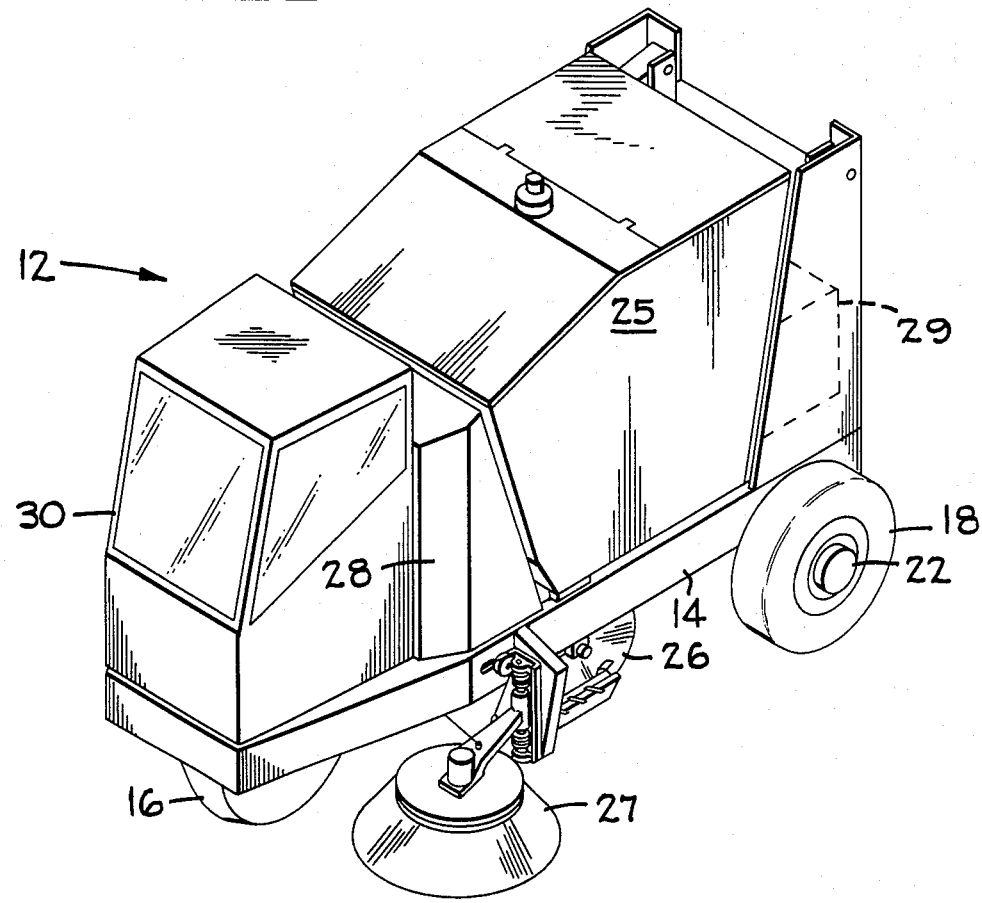
FIG_3
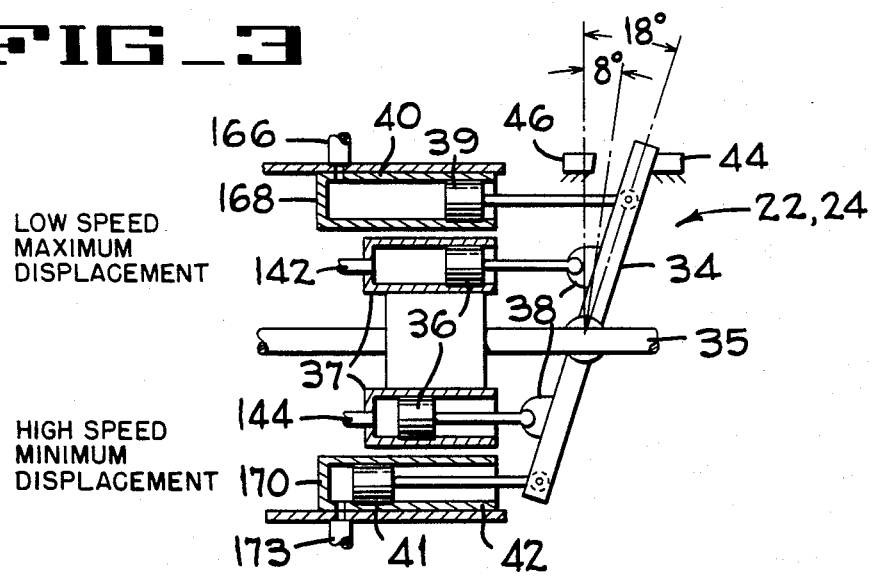

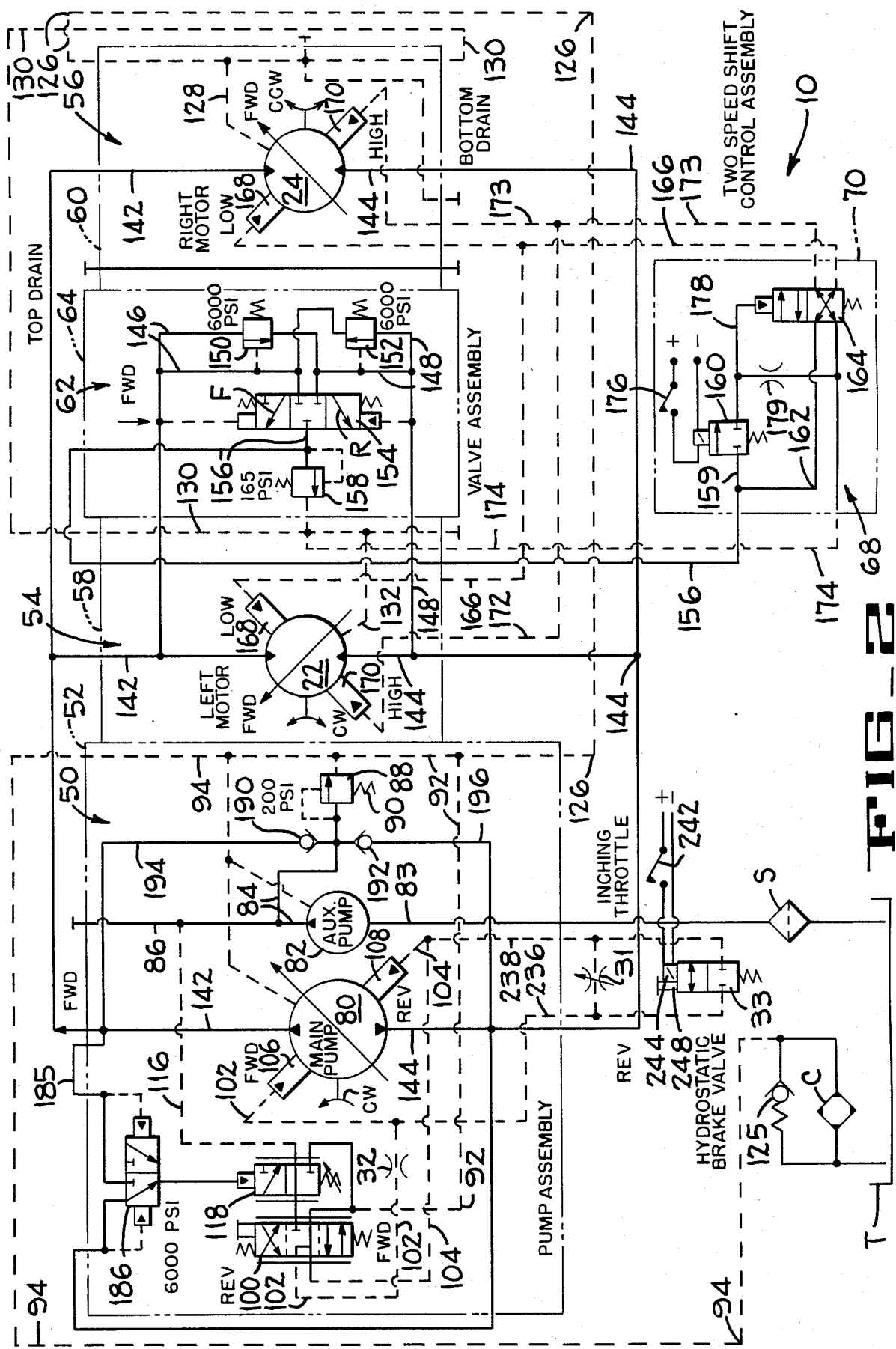
FIG_2

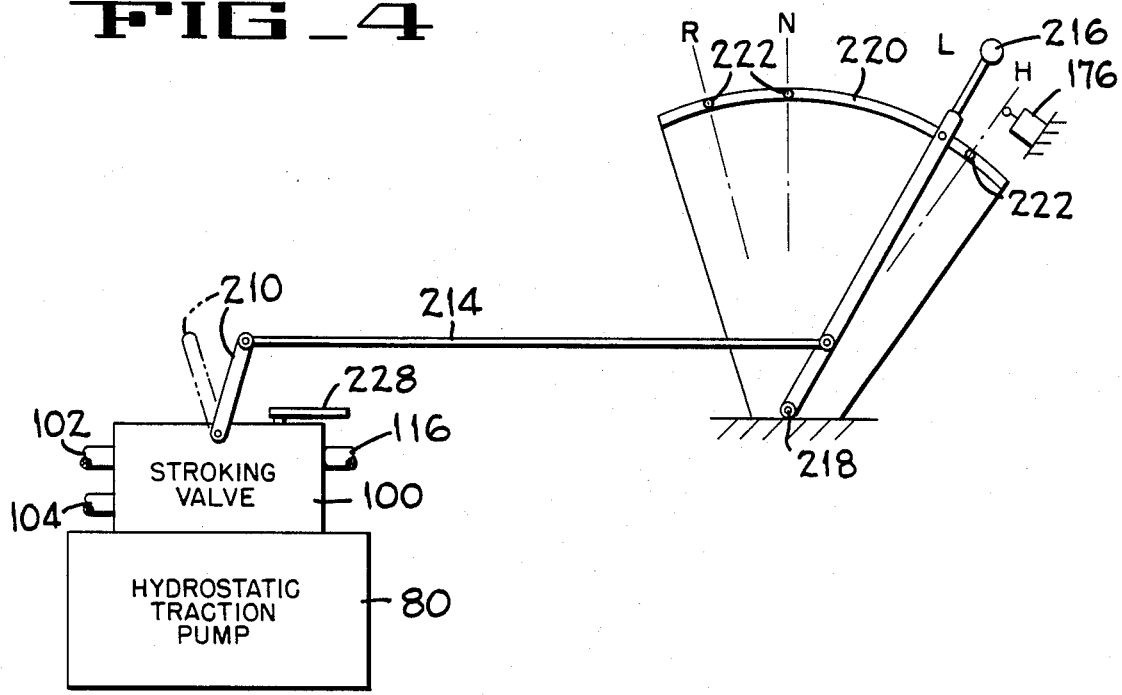
FIG_4
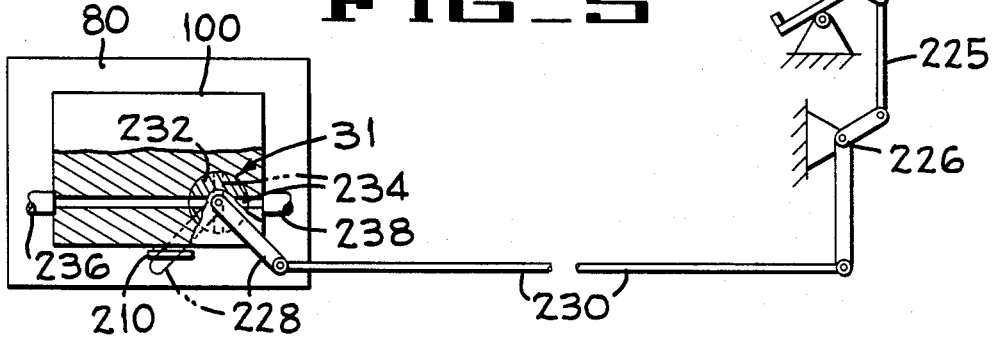
FIG_5
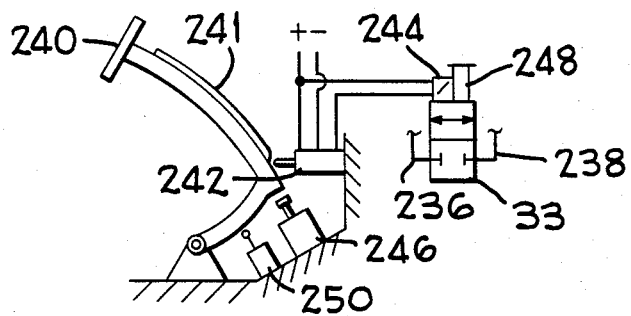
FIG_6

HYDROSTATIC PROPULSION SYSTEM AND METHOD WITH INCHING THROTTLE AND BRAKE

CROSS REFERENCE TO RELATED APPLICATION

The present invention is related to the invention disclosed in my copending application Ser. No. 431,947 filed on Sept. 30, 1982 and entitled Sweeper With Hydraulically Driven Components. The disclosure of my above identified application is incorporated by reference herein.

BACKGROUND OF THE INVENTION

Field of the Invention

The present invention relates to street sweepers or the like and more particularly relates to such sweepers with a hydrostatic propulsion system and method of operation having an inching throttle and a hydrostatic brake incorporated therein.

Description of the Prior Art

Street sweepers with mechanical drives to the propulsion wheels are illustrated in U.S. Pat. No. 3,316,578 to Tamny dated May 2, 1967; and Woodworth U.S. Pat. No. 3,636,580 which issued on Jan. 25, 1982.

SUMMARY OF THE INVENTION

The present invention relates to a hydrostatic drive system for a sweeper or the like with a two speed shift control and with an inching throttle valve for smooth low speed operation. An operator shift control lever similar to the shift control lever of an automatic transmission of an automobile is connected to the mechanically operated stroking valve of a traction pump for moving the stroking valve between a reverse, neutral, low forward speed, and high forward speed range. An accelerator pedal is connected to the inching throttle valve for moving the throttle between zero speed and a maximum speed position. The accelerator pedal when released and a brake pedal when depressed first activates the hydrostatic drive system to provide a hydrostatic braking force. Further depression of the brake pedal applies additional braking forces for panic stops which is applied by a standard hydraulic brake system.

BRIEF DESCRIPTION OF THE DRAWINGS

FIG. 1 is a diagrammatic perspective of a three wheel street sweeper powered by the hydrostatic drive system of the present invention.

FIG. 2 is a hydraulic diagram of the hydrostatic drive system of the mobile street sweeper of FIG. 1.

FIG. 3 is a diagrammatic illustration of one of the swash plate propulsion drive motors.

FIG. 4 is a diagrammatic side elevation of a shift control lever connected to the stroking valve of a traction pump.

FIG. 5 is a diagrammatic plan of the stroking valve of the traction pump connected to an accelerator pedal which is shown in elevation.

FIG. 6 is a diagrammatic elevation of a brake pedal shown in inoperative position and adjacent a switch which pedal when depressed first actuates the hydrostatic braking system and thereafter actuates the master cylinder of a standard hydraulic brake system.

DESCRIPTION OF THE PREFERRED EMBODIMENT

The hydrostatic propulsion system 10 (FIG. 2) of the present invention includes an inching drive and brake and is intended for use with a vehicle such as a street sweeper 12 (FIG. 1).

The street sweeper 12 comprises a chassis 14 mounted on a steerable front wheel 16 and two rear wheels 18 (only one being shown) driven by hydraulic motors 22 and 24 (FIG. 2). The Sweeper includes a hopper 25 which receives debris from a main broom 26 and a pair of gutter brooms 27 (only one being shown). The debris swept by the brooms is elevated into the hopper 25 by an elevator (not shown) disposed within a housing 28 for discharge into the hopper 25. All of the above components are driven by power from an engine 29 which drives a hydraulic control system described in my above referred to copending application, and the hydrostatic propulsion system 10 of the present invention. The rear wheels 18 are driven and controlled by the hydrostatic propulsion system 10. An operator in a cab 30 is provided with the controls to operate the sweeper.

The hydrostatic propulsion system 10 (FIG. 2) is similar to that disclosed in my cross-referenced application except that certain pilot operated components have been changed to manually operated components; and an inching throttle valve 31, an orifice 32, and a hydrostatic brake valve 33 have been added to the system thereby considerably improving the performance of the vehicle.

FIG. 3 diagrammatically illustrates motor 22 which is identical to motor 24 and includes a non-rotatable swash plate 34 journaled on a rotatable motor shaft 35 and illustrated in its low speed, high capacity starting position. Main pistons 36 and cylinders 37 are secured to and rotate with the shaft 35 in response to receiving high pressure fluid in one cylinder and discharging the fluid from the other cylinder. The pistons include feet 38 which slide against the non-rotatable swash plate thus imparting rotation to the shaft 35 and the main piston and cylinder units slidably connected thereto. A "forward" non-rotatable stroking control piston 39 and cylinder 40, and a "reverse" stroking control piston 41 and cylinder 42 are provided for controlling the angle of the swash plate 34 and thus the speed ranges of the motors. The pistons 39,41 are connected to the swash plate 34. Stationary abutments 44 and 46 limit the pivotal movement of the swash plate between a maximum displacement, low speed 18° position and a minimum displacement high speed 8° position.

Hydrostatic Propulsion Drive

The hydrostatic propulsion drive system 10 (FIG. 2) comprises a pump assembly 50 which includes the components located within a housing illustrated by phantom lines 52; left and right motor assemblies 54,56 that include the components located within the housings illustrated by phantom lines 58,60, respectively; a valve assembly 62 illustrated between the motor assembly and outlined within phantom line 64; a two-speed shift control assembly 68 illustrated within phantom line 70; the inching throttle valve 31, the orifice 32, and the hydrostatic brake valve 33; and a conventional sump or tank T.

The pump assembly 50 includes a main positive displacement, swash plate pump 80 and an auxiliary pump 82, both of which are of conventional design and are driven by the vehicle engine 29 (FIG. 1) in a counterclockwise direction indicated by the arrow CW (FIG. 2). The auxiliary pump 82 draws hydraulic fluid through conduit 83 from the tank T and circulates the fluid into the main pump 80 to first charge and thereafter maintain the main pump charged. The auxiliary pump 82 also circulates the fluid through a conventional screen S and provides make-up fluid for the main pump 80.

It will be understood that the pump 80 is similar to the motors disclosed in FIG. 3 except the swash plate is movable to both sides of the zero degree position, and the shaft is driven by the engine 29 (FIG. 1) rather than being driven by fluid from the pump 80.

The left hydrostatic wheel motor 22 (FIGS. 1 and 2) and the right hydraulic motor 24 (FIG. 2) are conventional positive displacement, swash plate motors which receive hydraulic fluid from the main pump 80 and receive control fluid from the auxiliary pump 82. As is well known in the art, when the pump 80 is being started, the pump swash plate will be positioned substantially normal to its axis of rotation and thus the pistons of the pump will be at low displacement and will pump very little, if any, fluid. Conversely, the swash plate 34 (FIG. 3) of each motor 22,24 will be positioned at the maximum angle relative to its axis of rotation, thus the pistons of the motor 22,24 will be at maximum displacement at start up.

With main pump 80 (FIG. 2) and auxiliary pump 82 started, hydraulic fluid will be drawn by the auxiliary pump 82 from the tank T through the suction conduit 83 which directs fluid into the conduits 84 and 86. When the pressure in conduit 84 exceeds 220 psi., a pilot pressure operated relief valve 88 is opened against the urging of a spring 90, thereby directing fluid into pilot lines 92 and 94. The pressure in line 92 is directed through a mechanically operated four-way stroking valve 100 in the pump assembly 50 when in its illustrated neutral position. Fluid at equal pressure is thus directed through the pilot lines 102 and 104 to the forward pump stroking means or swash plate control unit 106 and to the reverse pump stroking means or swash plate control unit 108 of the main hydraulic pump 80, thus maintaining the main pump at or near zero displacement.

When the four-way valve 100 is in neutral as indicated in FIG. 2, fluid in pilot line 116 flows through a parallel passage in a pressure override valve 118 but is blocked from further flow by the centered core of manual stroking control valve 100.

It will be noted that the fluid in line 94 normally flows through a cooler C to tank T. However, a spring loaded cooler by-pass check valve 125 is opened when the pressure in conduit 94 exceeds 25 psi.

With the mechanically operated valve 100 in the illustrated neutral position, pilot pressure from conduit 92 is directed to the motor assemblies 54,56 through pilot lines 92,126. Pilot pressure and make-up fluid from line 126 enters the right propulsion motor 24 through line 128; and enters the left propulsion motor 22 through lines 130 and 132.

When the operator wishes to drive the sweeper in a forward direction, the spool of the mechanically operated pump stroking valve 100 is moved upwardly (FIG. 2) to the parallel passage position by means to be described hereinafter. The pilot fluid from line 116 then flows through the parallel passages in valves 118 and 100 and line 102 to the forward pump stroking means or swash plate displacement control unit 106 thus pumping propulsion fluid at the desired capacity through a forward conduit 142 into the two hydraulic motors 22 and 24 to drive the motors in a forward direction. Low pressure fluid discharged from the motors 22 and 24 returns through "reverse" conduits 144 to the reverse outlet of the variable displacement pump 80.

In order to drive the sweeper in reverse, the operator actuates controls to be described hereinafter, to shift the mechanically operated valve 100 to the cross-passage position. Pilot fluid from line 116 then flows into conduit 104 to the reverse pump stroking means or swash plate control unit 108 which then pumps propulsion fluid into the reverse ports of the two motors 22 and 24 through "reverse" conduits 144 thereby driving the vehicle in reverse direction with the return fluid returning to the pump 80 through "forward" conduit 142.

The valve assembly 62 receives hydraulic fluid from forward conduit 142 and reverse conduit 144 which directs fluid into the conduits 146 and 148, respectively. Conduits 146 and 148 communicate with a 6,000 psi spring loaded pressure relief valve 150 and 152, respectively. The conduits 146 and 148 also communicate with opposite ends of a three-position pilot operated shuttle valve 154. When driving the vehicle in a forward direction, high pressure will be present in "forward" conduits 142 and 146, and the conduits 144 and 148 will be at a lower pressure thus shifting the core of the shuttle valve 154 downwardly (FIG. 2).

The components in the valve assembly 62 cooperate with the components in the two-speed shift control assembly 68 in order to control the displacement of the pistons 36 (FIG. 3) in the motors 22,24 and thus the output speed ranges of the motors.

When the motors 22,24 are being driven forward in response to shifting the mechanically operated valve 100 to the parallel passage position, the shuttle valve 154 is piloted down (FIG. 2) with its cross passage F communicating with a low pressure line 148 and with a line 156 connected to a 165 psi relief valve 158. When the pressure in line 156 is less than 165 psi, valve 158 remains closed and prevents flow of fluid through motor cylinders 36 (FIG. 3).

When relief valve 158 is opened by the pressure in excess of 165 psi, fluid flows through passage F of shuttle valve 154 and through conduit 156 to the shift control assembly 68. This fluid then flows through conduit 159 and is blocked by closed solenoid valve or high speed motor valve 160. This fluid further flows through conduit 162, a cross-passage and pilot operated valve 164, through conduit 166 and into cylinder 40 (FIG. 3) of low speed swash plate control unit 168 of each motor 22,24 thus urging the swash plate 34 toward the low speed 18° position. Some fluid drains out of the cylinder 42 of reverse swash plate control unit 170 of each motor for return to the two-speed shift assembly 68 through conduits 172 and 173. This return fluid then flows through a cross-passage in valve 164 and returns to the reverse pump stroking means or control unit 108 of the pump 80 through conduits 174,130,126,92, a parallel passage in valve 100 and conduit 104. It will be noted that excess fluid in line 156 will pass through the open relief valve 158 and flow into line 130 for return to the reverse control unit 108 as above described. The hydraulic motors 22,24 will drive the sweeper at a low speed range of about 0–10 miles per hour when receiving fluid through the last described circuits.

The solenoid valve 160 of the two-speed shift assembly 68 is opened in response to the operator closing a switch 176 in the cab 30 (as will be described later) when a speed range of between about 0–20 miles per hour in the forward direction is desired. High pressure fluid then flows from conduits 156 and 159, through open solenoid valve 160, and through conduit 178 which pilots valve 164 to its parallel passage position. Some of the high pressure fluid then flows through a restrictor 179 into return line 174, while the bulk of the fluid flows from conduit 162 through a parallel passage in valve 164, through previously described conduits to high speed control cylinder 42 (FIG. 3) in each swash plate control unit 170 of motors 22,24 thus urging the swash plate 34 toward its high speed 8° position. Some fluid return from the cylinder 40 of the low speed swash plate control unit 168 of each motor 22,24, flows through previously described conduits and the other parallel passage in valve 164 for return to conduit 174 and the tank T through conduits 130,126,92, 94 and cooler C as previously described.

It will be understood that springs are provided in each motor for urging the swash plates toward their low speed, maximum displacement 18° position relative to a plane perpendicular to the shaft of the motor; and that high speed, minimum displacement occurs at about 8° from said plane.

When driving the vehicle in reverse, the operator actuates the mechanically operated pump stroking valve 100 to its reverse or cross-passage position to reverse the direction of flow of fluid into the main pump 80 as previously described, thereby directing high pressure fluid through conduit 144 into the reverse conduits 144, 148 of the valve assembly 62 which pilots shuttle valve 154 upwardly causing fluid from the conduit 146 to flow through passage R in shuttle valve 154 thereby driving motors 22,24 in their reverse direction. Since the operations performed by the valve assembly 62 and the two-speed shift control assembly 68 are substantially the same as that described in regard to controlling the forward speed of the sweeper, the description of this portion of the circuit is considered unnecessary.

The circuit 10 (FIG. 2) also includes high pressure protection components which protect the hydraulic components from damage. Assuming that the mechanically operated stroking valve 100 is moved to its parallel passage or forward position, and that hydraulic pressure in conduits 142 and 146 exceed 6000 psi, relief valve 150 will first open thereby directing 6000 psi fluid through valve 150 into "reverse" conduit 148, thus piloting valve 152 open and balancing the pressure on opposite sides of the two motors 22,24, returning the shuttle valve 154 to its illustrated central position thereby stopping the flow of fluid through the motors. The 6000 psi pressure in conduit 142 and conduit 185 will also be directed into a pilot operated 6000 psi override control valve 186 in the pump unit 50 to shift override valve 186 to the left (FIG. 2) thereby piloting valve 118 to its cross-passage position. With valve 118 in its cross-passage position, further flow from line 116 through the valve 118 is blocked and a conduit 102 communicating with the forward pump stroking means or swash plate unit 106 of main pump 80 is opened through cross-passage in valve 118 to reverse line 92 thereby reducing the pressure in line 102. Thus, the pressure is reduced below 6000 psi in the hydraulic system 10 of FIG. 2 allowing the protective components to return to their illustrated positions.

If the vehicle is being driven in a reverse direction and the pressure in conduit 148 exceeds 6000 psi, relief valve 152 will first open, rather than or before relief valve 150 opens, thus opening the pressure override control valve 186 and shifting pilot operated valve 118 to reverse the flow of fluid to the pump stroking means or control units 108,106 of the main pump 80 until the maximum pressure drops to a safe pressure below 6000 psi.

A pair of check valves 190,192 are included in the circuit 10 to assure that a supply of hydraulic fluid is always available for compensating for fluid loss by leakage or the like. When the stroking valve 100 is in its parallel passage forward position and the inching throttle valve is at least partially closed, the main pump 80 will direct high pressure fluid through conduit 142 and a conduit 194 thereby holding check valve 190 closed. Thus, the fluid from auxiliary pump 82 flows through conduit 84 to the junction of the check valves 190,192, but cannot open check valve 190. However, check valve 192 is opened thereby directing fluid through conduits 196,144 and 148 to provide a supply of fluid to the motors 22,24 and the components in the valve assembly 62.

When the stroking valve 100 is in its reverse position, high pressure fluid from the main pump 80 will be conducted to check valve 192 through conduits 144,196 and holds it closed. Fluid from auxiliary pump 82 then flows through conduit 84, opens check valve 190 and flows through conduits 194,142 and 146 to provide a supply of fluid to the motor assemblies 54 and 56, and to the pump assembly 62.

It will also be understood that the housings of the pump assembly 50, the motor assemblies 54 and 56, and the valve assembly 62 each have conventional "top drain" and "bottom drain" ports which drain leaking fluid to the tank T through conduits (not shown) in a conventional manner and thus will not be described.

It will also be understood that the specific fluid pressures referred to herein are given as approximate pressures to be used with the improved embodiment of the sweeper of the present invention, and that these pressures are not deemed critical.

In order to provide smooth operation of the traction drive or propulsion system of the sweeper 12, and to provide the operator with controls with which he is familiar, operator controls have been provided which are similar to those of the well known controls used on certain modern automatic transmission motor vehicles.

Having reference to FIG. 4, a control lever 210 is connected to the stroking valve 100 of the traction pump 80 for controlling the position of the wobble plate (not shown) of the pump between a reverse position and a high speed forward position. A rod 214 is pivotally connected to the lever 210 and to a shift lever 216 which is pivoted at 218. The shift lever 216 cooperates with a quadrant 220 which has detents 222 thereon which maintains the shifting lever 216 in one of four positions until the operator moves it to another position. As shown in FIG. 4, the shift lever 216 is placed in the low forward range L. The lever may be shifted to the reverse position R; the neutral position N which places the swash plate of the pump perpendicular to its axis of rotation; to the low position L at which time the forward speed range is between 0–10 miles per hour; and to the high speed range H of 0–20 miles per hour. When in the high speed range H, the shift lever closes switch 176 in the two speed shift control assembly 68 (FIG. 2).

It will be understood that movement of the shift lever 216 between its several operative positions will have no affect unless an accelerator pedal 224 (FIG. 5) is depressed since the inching throttle valve 31 is open when the pedal is not depressed thus balancing the pressure on the forward and reverse swash plate control units 106,108.

The accelerator pedal 224 is pivoted intermediate its ends to the floor of the cab 30 and is diagrammatically illustrated as having a link 225 pivoted between a short arm of a bell crank 226 and the pedal 224. The bell crank 226 is pivoted to the floor and is pivotally connected to an inching throttle lever 228 by a rod 230. The inching throttle 31 is diagrammatically illustrated as including a rotatable core 232 with a passage 234 therethrough. When the accelerator pedal 224 is not depressed, the passage 234 is fully opened thereby balancing fluid pressure in the forward and rear pump control units 106,108 (FIG. 2), respectively, by fluid flowing through conduits 236,238 (FIGS. 2 and 5). When accelerator pedal 224 is gradually depressed and the mechanically operated stroking valve 100 (FIGS. 2,4 and 5) is placed in one of its vehicle driving positions such as forward position L; the passage 234 in valve 232 is gradually closed thus increasing the pressure to the forward pump stroking means or control unit 106 (FIG. 2). When the passage 234 is fully closed, the forward control unit 106 is at maximum displacement and pressure, and the reverse stroking means or control unit 108 is opened to "bottom drain" which returns excess fluid to tank T.

It has been determined that an optimum smooth drive control is provided if the previously mentioned orifice 32 in conduit 102 of FIG. 2 is about 0.044 inches in diameter.

It is apparent that when the shift lever 216 (FIG. 4) is in reverse R, that stroking valve 100 (FIG. 2) will be shifted to the cross-passage position and the sweeper 12 will be driven in reverse in response to depressing the accelerator pedal 224.

As shown in FIGS. 2 and 6, the solenoid operated hydrostatic brake valve 33 is shown in an inoperative position with the fluid in conduit 236,238 being blocked from flow through the core of the valve 33. A conventional brake pedal 240 is pivotally mounted in the cab 30 and when depressed moves a cam 241 into position to close a switch 242 connected to the solenoid 244 of valve 33 for shifting the valve 33 to its open parallel passage position thereby allowing fluid to flow between conduits 236 and 238, through conduits 102 and 104 to the forward and reverse stroking valve 106 and 108, respectively. While the fluid pressure is equalizing in the forward and reverse stroking valves, and the pump wobble plate (not shown) is returning to its neutral position, a hydrostatic braking action acts on the rear wheel motors 22 and 24 thereby slowing and then stopping the sweeper 12.

The operator primarily relies on the hydrostatic braking system for stopping the sweeper whether moving forward or in reverse. However, further depression of the brake pedal 240 actuates a conventional hydraulic rear wheel braking system illustrated only by a master cylinder 246, which conventional system is used primarily for panic stops. The brake valve 33 may also be operated by a manual fail safe push button 248 which overrides the solenoid 244 and prevents movement of the sweeper 12 even though the operator has the shift lever 216 in the reverse or one of the forward positions and has depressed the accelerator pedal 224. A brake light switch 250 is closed upon depressing the brake pedal 240.

In operation of the hydrostatic propulsion system 10 of the present invention, the engine 29 (FIG. 1) is first started thereby providing hydraulic fluid to the system 10. The operator, while seated in the cab 30, then places the shift lever 216 (FIG. 4) in reverse R, low L, or high H, depending on which direction and at what speed range he desires. Assuming that the operator places the shift lever 216 in the high speed range, the high speed switch 176 (FIGS. 2 and 4) is closed and the operator can control the vehicle to travel between 0–20 miles per hour by depressing the accelerator pedal 224 (FIG. 5) different amounts. Shifting the lever 216 into the high speed position has no affect until the operator depresses the accelerator pedal 224 (FIG. 5) thereby shifting the core 232 of the inching throttle valve 31 from its fully open position to a partially or fully closed position depending upon whether he wishes to drive slowly or fast.

If the operator removes his foot from the accelerator pedal 224, while driving, the valve core 232 will be spring urged into its open position thereby providing the hydrostatic braking action. If the operator wants additional braking action, he depresses the brake pedal 240 (FIG. 6) a sufficient amount to close switch 242 and open solenoid brake valve 33 which provides hydrostatic braking action which is normally used to stop the vehicle. If a panic braking situation occurs, the operator depresses the brake further thereby actuating the master cylinder 246 of a conventional hydraulic braking system which applies the braking force to stop the rear wheels 18 only one being shown (FIG. 1).

From the foregoing description it is apparent that a hydrostatic propulsion system is disclosed which makes available to the operator standard automobile type controls for operating a hydrostatic propulsion driving system smoothly without abrupt jerking as experienced with known hydrostatic drives. The controls are also safe to operate since the shift lever has no affect when in any of its selected positions until the inching throttle valve is closed in response to the operator depressing the accelerator pedal. When the operator permits the accelerator pedal to raise when he is driving the sweeper, a hydrostatic braking action occurs, and the vehicle is normally stopped by lightly depressing a brake pedal which closes a switch and applies a hydrostatic braking force sufficient to stop the vehicle under normal conditions.

Although the best mode contemplated for carrying out the present invention has been herein shown and described, it will be apparent that modification and variation may be made without departing from what is regarded to be the subject matter of the invention.

What is claimed is:

1. A hydrostatic propulsion system for a vehicle such as a mobile sweeper or the like having driven wheels, comprising:
   means defining a main power driven positive displacement swash plate pump including pistons and having forward and reverse pump stroking means for varying the position of the swash plate between zero piston displacement to full forward or full reverse piston displacement;
   means defining at least one swash plate motor operatively connected to said pump and to at least one driven wheel and having low speed and high speed motor stroking means for varying the position of the motor swash plate betwewen an initial high piston displacement low speed position and a low piston displacement high speed position;

means defining a pump stroking valve;

means for providing and maintaining hydraulic fluid in said main pump and in said motor;

operator controlled shift means for moving said stroking valve between a neutral position and at least one pump selected operative position;

inching throttle valve means movable between a fully open position and a fully closed position and in fluid communication with both of said pump stroking means and said stroking valve;

operator controlled accelerator means for moving said throttle valve means between a fully open position and said fully closed position for progressively moving said pump stroking means between zero piston displacement and a positive piston displacement when said pump stroking valve is in said selected operative position for driving the vehicle in the selected direction;

a hydrostatic brake valve connected in parallel with said inching valve and movable between a normal fully closed position and an open position, and a manually operated brake pedal operatively connected to said brake valve for shifting the valve to said open position upon initial movement of said pedal for balancing the fluid pressure acting on both of said pump stroking means for providing a hydrostatic braking force to the vehicle.

2. An apparatus according to claim 1 wherein said brake valve is a solenoid operated valve, and additionally comprising a switch connected to said solenoid valve which is closed upon initial movement of said brake pedal thereby opening said brake valve.

3. An apparatus according to claim 1 and additionally comprising conventional hydraulic brake means associated with said at least one wheel and responsive to movement of said brake pedal past said initial movement for applying said conventional brakes in a panic stop situation.

4. A hydrostatic propulsion system for a vehicle such as a mobile sweeper or the like having driven wheels, comprising:

means defining a main power driven positive displacement swash plate pump including pistons and having forward and reverse pump stroking means for varying the position of the swash plate between zero piston displacement to full forward or full reverse piston displacement;

means defining at least one swash plate motor operatively connected to said pump and to at least one driven wheel and having low speed and high speed motor stroking means for varying the position of the motor swash plate between an initial high piston displacement low speed position and a low piston displacement high speed position;

means defining a pump stroking valve;

means for providing and maintaining hydraulic fluid in said main pump and in said motor;

operator controlled shift means for moving said stroking valve between a neutral position and at least one pump selected operative position;

inching throttle valve means movable between a fully open position and a fully closed position and in fluid communication with both of said pump stroking means and said stroking valve;

operator controlled accelerator means for moving said throttle valve means between a fully open position and said fully closed position for progressively moving said pump stroking means between zero piston displacement and a positive piston displacement when said pump stroking valve is in said selected operative position for driving the vehicle in the selected direction;

said shifting means including a manually operated lever, a quadrant adjacent said lever and having reverse, neutral, low and high speed positions thereon with said reverse, low and high speed positions being said selected operative positions, and a plurality of detent means positioned between said lever and said quadrant for maintaining said lever in specific ones of said selected positions until said lever is manually moved to a different position;

said accelerator means including an accelerator pedal controlled by the foot of an operator for moving said throttle valve from a fully opened position to a fully closed position for progressively increasing the speed of the vehicle until the throttle valve is fully closed, and additionally comprising a high speed motor valve operatively connected to said high speed motor stroking means, switch means operatively connected to said high motor speed valve and responsive to said lever being in its high speed position to open said high speed valve;

when said throttle valve is in its open position to establish equal pressure on said forward and reverse pump stroking means, when said lever is in said high speed position to prepare said vehicle for movement in a forward direction in a high speed range, and when said accelerator pedal is actuated to progressively close said throttle valve; said high pressure fluid being directed into said high speed motor stroking means to shift or maintain the motor swash plate in its high speed position for driving the vehicle in a forward direction in a high speed range at speeds proportional to the degree of closure of the throttle valve.

5. A method of controlling the speed of a mobile vehicle driven by a hydrostatic pump in fluid communication with a hydrostatic motor drivingly connected to at least one wheel of the vehicle, said pump and motor each including a pivotal swash plate for varying the displacement of associated pistons in response to actuation of forward and reverse pump stroking means and low speed and high speed motor stroking means, and including a pump stroking valve, said pump stroking valve being connected to a shift lever, and an inching valve being connected to the accelerator pedal, comprising the steps of:

maintaining a supply of hydraulic fluid for said hydrostatic pump and said motor;

selectively positioning said lever to a position which opens the pump stroking valve to a position which initially communicates high pressure fluid to one of the pump stroking means and to thereafter equalize the pressure on both pump stroking means, and progressively moving the accelerator pedal to a position which closes said inching throttle valve which communicates with the forward and reverse pump stroking means between a fully open position and a fully closed position for progressively varying the pressure acting on said forward and reverse pump stroking means from an equal pressure and zero pump displacement to a position wherein said one of the pump stroking means is at maximum pressure and the pump pistons are at maximum displacement for directing fluid to the motor for slowly and smoothly increasing the speed of the vehicle in the selected direction as determined by the degree of closure of the throttle valve, when moving the shift lever into a high forward speed setting said lever position being responsive for directing the high pressure fluid into the high speed motor stroking means for providing minimum motor piston displacement and a high forward speed range of between about 0–20 miles per hour.

6. A method according to claim 5 wherein the step of moving the lever into the high speed forward setting actuates switching means which reverses the normal slow speed flow path of the fluid to the motor stroking means thereby shifting the swash plate of the motor to an angle of approximately 8° from a position normal to the axis of rotation of the motor pistons.

7. A method according to claim 5 and additionally comprising the steps of initially applying a hydrostatic braking force to the wheel in response to initial actuation of a brake pedal which balances the fluid pressure acting on the forward and reverse pump stroking means while further actuation of the brake pedal actuates a conventional rear wheel braking system.

* * * * *